(No Model.)
2 Sheets—Sheet 2.
J. J. TONKIN.
STIRRER FOR STARCH SETTLING TANKS.
No. 258,265.
Patented May 23, 1882.
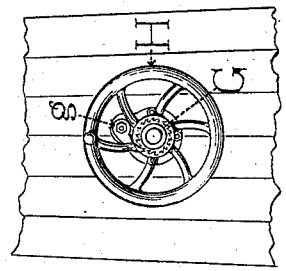
Fig. 6.
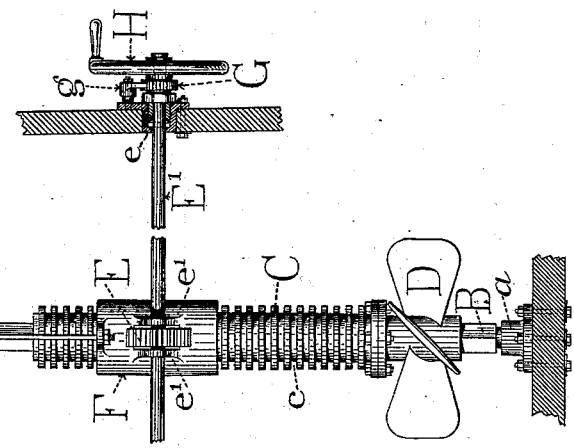
Fig. 4.
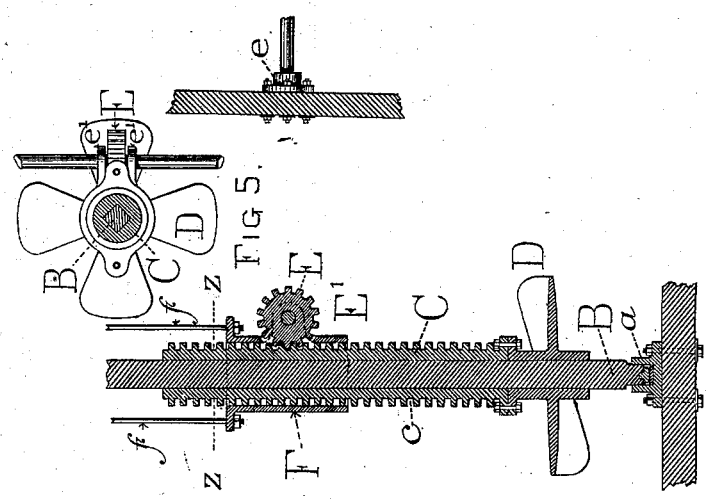
Fig. 5.
Fig. 3.
WITNESSES.
M. L. Adams
W. F. Heath
INVENTOR.
John J. Tonkin,
Per Edw. E. Quimby,
atty.

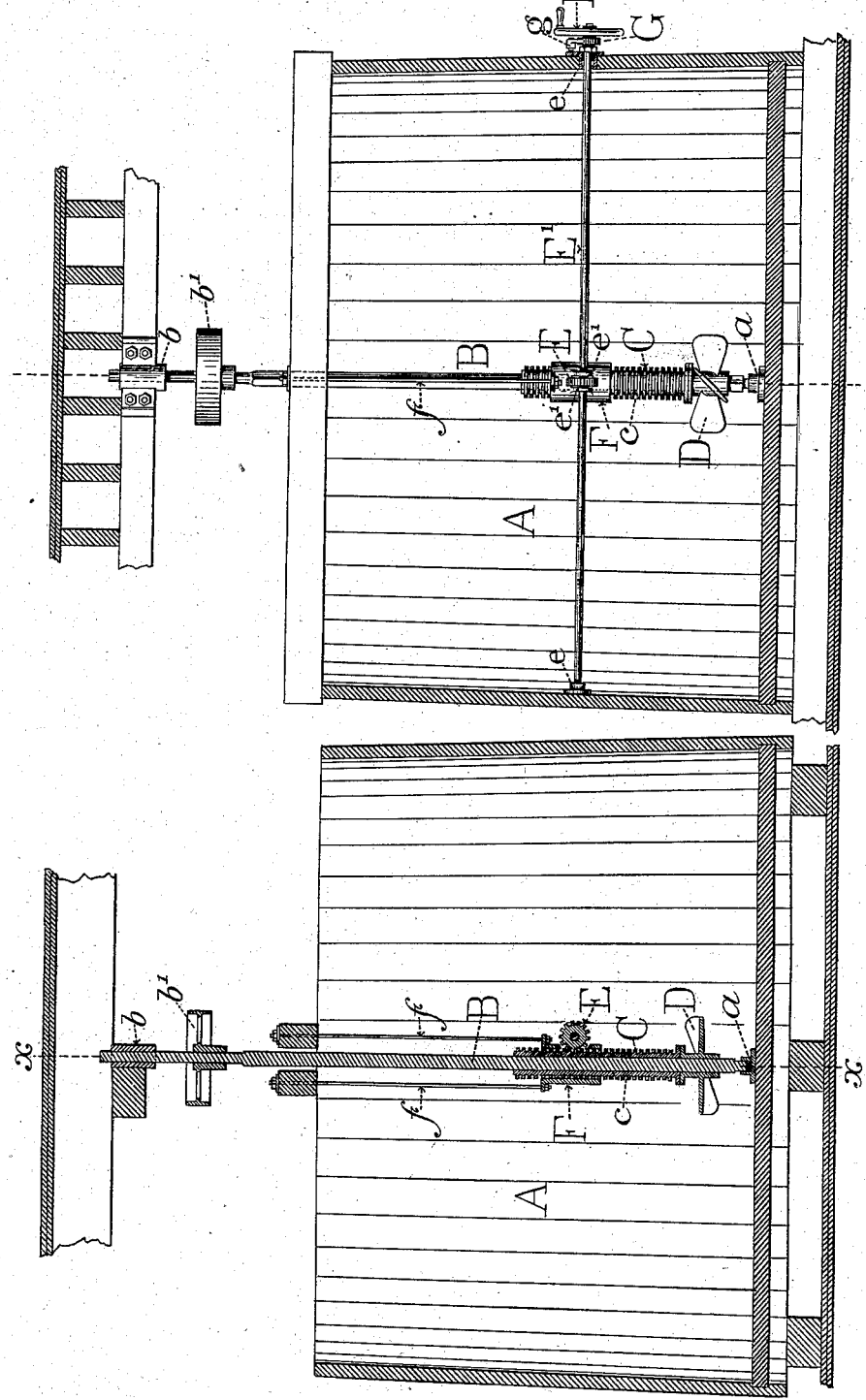

UNITED STATES PATENT OFFICE.

JOHN J. TONKIN, OF CHICAGO, ILLINOIS, ASSIGNOR TO THE CHICAGO SUGAR REFINING COMPANY, OF SAME PLACE.

STIRRER FOR STARCH-SETTLING TANKS.

SPECIFICATION forming part of Letters Patent No. 258,265, dated May 23, 1882.

Application filed April 10, 1882. (No model.)

*To all whom it may concern:*

Be it known that I, JOHN J. TONKIN, of Chicago, Illinois, have invented a certain Improvement in Stirrers for Starch-Settling Tanks, of which the following is a specification.

In the manufacture of starch starch liquor is allowed to remain some time in settling-tanks. The starch settles upon the bottom of the tank, forming a deposit which requires to be afterward stirred up and mixed with water in order that it may have sufficient fluidity to flow from the tank through a discharge-pipe at the bottom. For this purpose such tanks are provided with rotating stirrers, which are raised above the lower part of the tank during the settling operation, and afterward lowered down upon the surface of the starch deposit for the purpose of stirring the starch and mixing it with fresh water introduced at that time into the tank.

The object of my invention is to facilitate the handling of such stirrers, which I accomplish by mounting a stirrer with radial arms in the form of propeller-blades upon the lower end of a sleeve of suitable length, the periphery of which is formed into a series of parallel circumferential grooves, and which is itself loosely mounted upon a square vertical shaft, having its lower end stepped in a journal at the bottom of the tank and its upper end provided with a suitable bearing, and with a pulley for receiving the belt by which it is rotated. The rotation of the square stem imparts a corresponding rotation to the sleeve and propeller attached thereto. The parallel circumferential grooves in the periphery of the sleeve convert it into a cylindrical rack, the teeth of which mesh into the teeth of a pinion mounted upon a horizontal shaft extending across and through the sides of the tank, and provided at one end with a hand or crank wheel and with a ratchet-wheel, the teeth of which are engaged by a detent-pawl pivoted to the outside of the wall of the tank. By this organization of devices I am enabled to raise or lower the stirring-wheel without arresting its rotation.

The accompanying drawings, representing a starch-settling tank provided with my improved stirrer, are as follows:

Figure 1 is a central vertical section of the tank and stirrer. Fig. 2 is a vertical section of the tank through the line $x\ x$ on Fig. 1, showing the stirrer in elevation. Fig. 3 is a vertical section of the stirrer on an enlarged scale, taken through the line $y\ y$ on Fig. 4. Fig. 4 is an elevation of the stirrer, showing the longitudinal elevator-shaft in side elevation. Fig. 5 is a transverse section through the line $z\ z$ on Fig. 3. Fig. 6 is a front elevation of the hand-wheel on the outer end of the elevator-shaft, showing the ratchet-wheel and detent-pawl in dotted lines.

The tank A is of the usual dimensions of such tanks—as, for example, say, thirteen feet in diameter and nine feet in height—and is provided at the bottom with a central journal, $a$, in which is stepped the lower end of the vertical rotating shaft B, provided with a suitable bearing, $b$, at its upper end, and with the pulley $b'$ for receiving the belt by which it is rotated. The shaft B is square in cross-section, and is loosely inserted through an aperture of corresponding shape in the sleeve C, to the lower end of which is affixed the stirring-wheel D. The periphery of the sleeve C is provided with the parallel circumferential grooves $c$, by which it is converted into a cylindrical rack, the teeth of which have the pitch required to enable them to mesh into the teeth of the elevator-pinion E, keyed to the horizontal shaft E', which is provided with the bearings $e\ e$ in the walls of the tank, and with the bearings $e'\ e'$ in the box F, which is suspended from a cross-bar at the top of the tank by means of the vertical rods $f\ f$. One end of the elevator-shaft extends through the wall of the tank, and is provided with the ratchet-wheel G, the teeth of which are engaged by the adjustable detent-pawl $g$, pivoted to the side of the tank. The projecting end of the elevator-shaft is also provided with the crank or hand wheel H, by means of which it is turned in one direction to elevate the cylindrical rack C, while the detent-pawl, by its engagement with the teeth of the ratchet-wheel G, prevents the reverse rotation of the elevator-shaft, and consequently prevents the cylinder-rack and stirring-wheel from dropping below the point to which they have been elevated.

In operation, when the starch has settled and the superincumbent liquor has been drawn off and fresh water is introduced into the tank, the detent-pawl is tripped from the ratchet-wheel and the elevator-shaft is permitted to turn in the required direction until the stirring-wheel has been lowered to the surface of the starch deposit. During the operation of stirring up the starch deposit and mixing it with the water the stirring-wheel may be raised or lowered from time to time, as the case may require, without stopping its rotation upon its own axis.

It will of course be understood that the shaft B and the bearings for it in the cylindrical rack C may be of any polygonal shape in cross-section, or may be round, in which latter case a feather or its equivalent may be employed for imparting the rotatory movement of the shaft to the cylindrical rack.

I claim as my invention—

1. The stirring-wheel D, affixed to the lower end of the hollow cylindrical rack C, adapted to slide upon the square shaft B, in combination with the pinion E, keyed to the elevator-shaft E′, provided with the hand-wheel H and with the ratchet-wheel G, for engagement by the detent-pawl g, pivoted to the wall of the tank, as and for the purpose set forth.

2. A hollow cylindrical rack, carrying upon its lower end a stirring-wheel, and loosely fitted upon a square rotating shaft, in combination with the box F, supported by the rods f f, and the pinion E, keyed to the elevator-shaft E′, and means for rotating the same, substantially as and for the purposes set forth.

JOHN J. TONKIN.

Witnesses:
F. O. MATTHIESSEN,
ARNO BEHR.